United States Patent [19]

Sinderson et al.

[11] Patent Number: 4,974,181

[45] Date of Patent: Nov. 27, 1990

[54] ADAPTIVE DATA ACQUISITION MULTIPLEXING SYSTEM AND METHOD

[75] Inventors: Richard L. Sinderson, Pearland; George A. Salazar, Friendswood; Clyde M. Haddick, Jr., Friendship; Caroll J. Spahn, Houston; Chikkabelarangala N. Venkatesh, Friendswood, all of Tex.

[73] Assignee: The United States of America as represented by the Adminstrator, of the National Aeronautics and Space Administration, Washington, D.C.

[21] Appl. No.: 182,266

[22] Filed: Apr. 15, 1988

[51] Int. Cl.[5] .............................................. G06F 15/20

[52] U.S. Cl. ....................................... 364/550; 324/115; 364/487

[58] Field of Search ................ 324/115; 364/483, 485, 364/487, 550, 551.01

[56] References Cited

U.S. PATENT DOCUMENTS

| | | | |
|---|---|---|---|
| Re. 31,750 | 11/1984 | Morrow | 364/508 |
| 2,444,202 | 6/1948 | McAlpine et al. | |
| 2,875,427 | 2/1959 | Koppel et al. | 340/870.11 |
| 3,030,614 | 4/1962 | Lehan et al. | 340/870.13 |
| 3,214,734 | 10/1965 | Whitehead | 340/825.05 |
| 3,588,364 | 6/1971 | Wallingford et al. | 179/15 |
| 3,665,417 | 5/1972 | Low et al. | 364/200 |
| 4,162,531 | 7/1979 | Rode et al. | 364/487 X |
| 4,234,926 | 11/1980 | Wallace et al. | 364/900 X |
| 4,476,535 | 10/1984 | Loshing et al. | 364/480 |
| 4,507,740 | 3/1985 | Star et al. | 364/487 |
| 4,510,803 | 4/1985 | Perara | 73/178 R |
| 4,571,588 | 2/1986 | Lee et al. | 324/115 X |
| 4,589,108 | 5/1986 | Billy | 370/84 |
| 4,638,451 | 1/1987 | Hester et al. | 364/900 |
| 4,780,910 | 10/1988 | Huddleston et al. | 340/825.54 X |
| 4,787,081 | 11/1988 | Waters et al. | 370/84 X |
| 4,812,996 | 3/1989 | Stubbs | 364/485 X |
| 4,831,558 | 5/1989 | Shoup et al. | 364/550 |

*Primary Examiner*—Parshotam S. Lall
*Assistant Examiner*—Edward R. Cosimano
*Attorney, Agent, or Firm*—Hardie R. Barr; John R. Manning; Edward K. Fein

[57] ABSTRACT

An adaptive data acquisition multiplexing system having a monitor terminal and one or more remote terminals with a communication link between them. The remote terminals each include signal conditioning for a plurality of sensors. Upon commands from the monitor terminal, signals providing the remote terminals' current configuration and status, and instructions for changing the remote terminal configuration, are transmitted from each remote terminal to the monitor terminal. Menu driven prompts at the monitor terminal permit commands to be transmitted from the monitor terminal to the remote terminals, selectively altering the configuration of any remote terminal to enable it to acquire and transmit data, as well as its configuration and status information, in the desired format. Alterations in any remote terminal's configuration can then be verified at the monitor terminal.

20 Claims, 2 Drawing Sheets

ADAPTIVE DATA ACQUISITION MULTIPLEXING SYSTEM AND METHOD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates to data acquisition multiplexing systems and, more particularly, relates to such systems which are adaptively reconfigurable.

2. Background Art

Data multiplexing system requirements for parameter measurements at a first location, transmission to and display at a second remote location typically do not change rapidly over time, a common example of which is illustrated in conventional plant process controller multiplexing systems. Thus, for many such applications, fixed hardware/software data multiplexing configurations have been adequate. When relatively infrequent instances arose necessitating post-installation system hardware reconfiguration, lead times were typically sufficient to effect the changes with minimal down time and expense. Thus, such systems were relatively flexible, provided that this lead time was available.

However, situations have arisen in the process control and data multiplexing arts wherein system parameter measurement changes often were extensive and/or desirably to be effected over relatively short periods of time. Notable examples of this occur in (1) space data system applications wherein system requirements may change between flights scheduled relatively short time periods apart; and, (2) production run plant process control applications wherein the production line and thus the production parameter measurement needs change with introduction of a new product or change in process controls to improve product quality.

Prior art systems required costly and time consuming data multiplexing hardware changeouts or modifications to meet the changing system demands. This, in turn, gave rise to numerous problems associated with the need for additional redesign, installation, and testing to effect the system changes. Due to these aforementioned problems, it was not uncommon to find that in many applications important and highly desired system changes for effecting parameter measurements were either never implemented or delayed, thus resulting in substandard system performance during the interim until the changes could be effected.

For the aforementioned reasons, technology developed which sought to ease the reconfigurability of data multiplexing systems. However, several drawbacks were associated with these attempts. One approach simply sought to facilitate the task of hardware changeouts, however this was ineffectual due to the sheer variety of apparatus associated with such data systems. Moreover, a fundamental problem still remained in the inability to reconfigure the data multiplexing system in real time during parameter measurement. But one example illustrating the need for this capability in data multiplexing systems occurs wherein measured data exceeds full scale during a production run, space flight, or the like. Valuable data is lost because the parameter measuring system may not be reconfigured or adjusted during the derivation of these measurements (due to the attendant need for hardware changes irrespective of how efficiently they may be implemented).

Yet, another approach sought to make changes in the remote measurement generating terminal by way of a central process or system control computer. However, these systems typically required a relatively complex central computer and associated highly trained operator effecting such reconfiguration as well as relatively complex software being resident at the central process control computer. Moreover, such systems in the prior art typically effected a relatively simple change in a measurement parameter as, for example, in varying at a remote location a single gain level of an instrumentation amplifier or the like.

From the foregoing, it will be readily apparent that it was highly desirable to provide a flexible data acquisition and multiplexing system which might be easily and inexpensively reconfigured on-line without the need for highly trained personnel. Moreover, such a system would further be desired which could be reconfigured in real time during derivation and transmission of measurements to meet changing parameter measurement conditions.

Still further, such a system would be desired which could facilitate reconfiguration by the relatively unskilled operator with highly simplified reconfiguration equipment, and wherein the same data acquisition/multiplexing hardware could remain in situ thereby avoiding the necessity of hardware changeouts or modifications.

Accordingly, a novel data acquisition and multiplexing system is provided having one or more remote terminals which store internally their own configuration parameter status for remote display and which contain software to transmit CRT menu/data page format instructions along with present parameter settings and real time data values to a simple monitor/keyboard terminal for operator information and use.

SUMMARY OF THE INVENTION

The present invention relates to adaptive data acquisition multiplexing systems and methods wherein system reconfiguration is desired and easily facilitated. A monitor-terminal is provided and a plurality of remote adaptive data terminals, and a communication link therebetween which may include a Mil-Std-1553B, RS 232 bus link, or the like. The adaptive terminals each include a signal conditioning for a plurality of external transducer sensors for measuring parameters which are converted by an ADC to digital form. Nonvolatile memory in the adaptive terminal's CPU stores instructions for prompting system memory reconfiguration commands. The measurements, instructions, and the adaptive terminal's present configuration and status data are transmitted to the monitor terminal and displayed. In response to menu-driven prompts generated and displayed at the monitor terminal from the instructions, system configuration and reconfiguration commands, data generation request commands, status and health commands and the like are input at the monitor terminal and transmitted to the remote adaptive terminals.

A CPU in each adaptive terminal receives the various configuration commands, stores them in nonvolatile electrically alterable memory (EAPROM), and reacts in accordance with the commands to configure a plurality of aspects of the system, generate parameter measurements, status and health signals, and the like, and transmit these signals from the respective remote adaptive terminals to the monitor-terminal for operator read-out and verification. Initial configuration and subsequent reconfigurations can be easily and quickly accomplished with the remote terminals in situ, and by a relatively unskilled operator using menu-driven CRT screen prompts. Therefore, the reconfigurations may be in real time during the general period of parameter measurement acquisition, and may include alteration of such characteristics as the gain, automatic gain rescaling, bias, and/or sampling rates associated with one or more of the parameter measurements made by the adaptive terminals, as well as channelization or other reconfiguration aspects as desired. The output digital data formed by the measurement parameters is provided to the monitor-terminal at a relatively slow measurement sampling rate, e.g. one sample per second, for ease of operator viewing. The second output is provided for data acquisitioning requiring higher sampling rates, e.g. 10–200 or more samples per second, and may be connected to external data transmission or monitor equipment, such as other data networks, telemetry transmitters or graphic recording devices. The remote terminals operate in an independent, self-contained manner and therefore are not dependent on monitor terminal connection or use except during the system reconfigurations or operator general checks of system and measurement parameter status.

DETAILED DESCRIPTION OF THE PREFERRED EMBODIMENT

Figure 1:
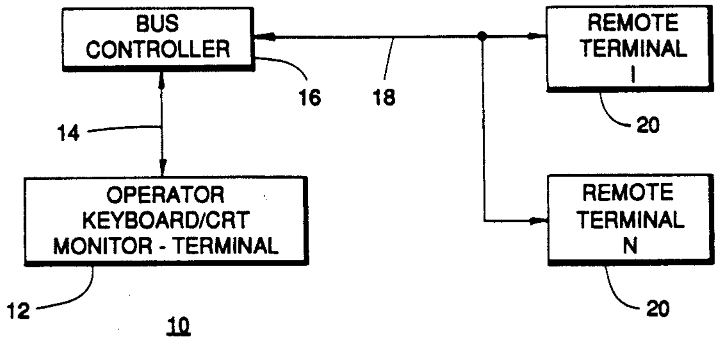
FIG. 1 is a functional block diagram of the data acquisition-multiplexing system in accordance with the present invention.

The invention may be embodied as depicted generally in FIG. 1, which is a functional block diagram of an adaptive data multiplexer system 10. A plurality of N remote adaptive terminals 20 generate digitally encoded parameter measurement data, status and configuration signals. Additionally, terminals 20 generate instructions to form a command menu display at a remote location for requesting initial set-up and subsequent reconfiguration commands at the operator's option to reconfigure one or more of the terminals 20. These data signals and instructions are transferred over network data bus 18 through a bus controller 16 and thence by means of communication path 14 to a monitor-terminal 12.

One purpose of the monitor terminal 12 is simply to display this measured parameter data, status signals, and instructions to verify proper adaptive terminal 20 set-up and proper acquisition of measurement data. It should be noted that after set-up verification, permanent connection of the monitor terminal 12 is not mandatory, and the adaptive terminals 20 can operate independently and provide their data multiplex output via the bus controller 16 to external data network transmission or telemetry or monitor equipment not shown 15. However, it is an important feature of the present invention to provide the ability to reconfigure these remote terminals 20 in a simple fashion under software control from the terminal 12. Accordingly, a further function of the terminal 12 is to permit an operator to input at terminal 12 commands in response to prompts from terminals 20. These commands may be transmitted over the path 14 through the bus controller 16 and thence to the terminals 20 and bus 18. One such command requests the terminals 20 to send back information regarding their status and health. Based upon this information or the aforementioned display of parameter data at the terminal 12 by the remote terminals 20, the operator may desire to reconfigure the terminals 20. Accordingly, a second type of command which may be generated at the terminal 12 instructs the terminals 20 to telemeter back aforementioned setup and reconfiguration commands for display in the form of command menus at the terminal 12. These menus prompt the operator to provide the necessary information to be conveyed to the terminals 20 for such reconfiguration. It will be appreciated that in a special case, the prompted-for commands may be for the initial parameter set-up for the terminals 20 rather than subsequent reconfiguration.

Numerous other commands may be provided for inputing at the monitor terminal 12 to which the remote terminals 20 may be responsive. Such commands might include a command to start data acquisition in one or more of the terminals 20, a command to initiate a self checking routine by the terminals 20, or even to download acquired data or measurement parameters (gain, sample rates, etc.) to another location such as another of the terminals 20 which may be functioning more properly. Thus, it will be appreciated that the types of commands which may be generated by the terminal 12 and transmitted to the terminals 20 are virtually unlimited.

It will be appreciated that three important features of the present invention are first, the ability to configure or reconfigure easily and promptly and in situ the remote terminals 20 under software control even under real time parameter measurement; secondly, the provision in the terminals 20 for storage of both retrievable data defining their present configurations and commands transmittable to the monitor terminal 12 to prompt subsequent generation of reconfiguration commands at the terminal 12 for delivery to the terminals 20 for such reconfiguration; and thirdly, the provision for adaptively altering all of the parameters normally required by a flexible data acquisition system, such as gain, bias level, sampling rate, and output channelization. Accordingly, notwithstanding the hereinbefore noted variety of command and information signals generatable by the terminals 12 and 20, only those relating to the first two important features of the system 10 just noted will be discussed initially for purposes of clarity of this disclosure.

Figure 2:
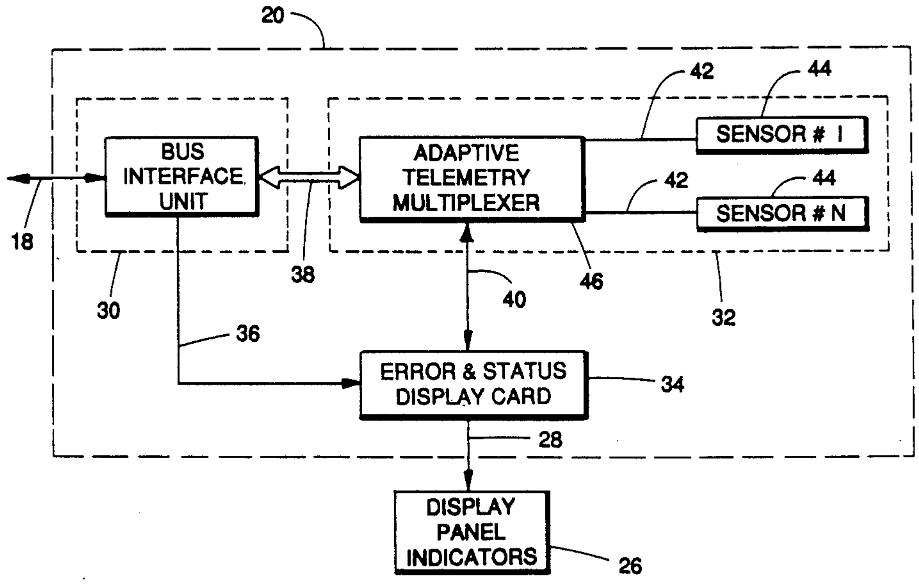
FIG. 2 is a more detailed functional block diagram of a remote terminal of the present invention depicted in FIG. 1.

With reference now to FIG. 2, a functional block diagram of one of the remote adaptive terminals 20 may be seen depicted therein which is interconnected by means of the network data bus 18 to the bus controller 16 illustrated in FIG. 1. Additionally, it will be noted in FIG. 2 that display panel indicators 26 may further be provided as desired which may be interconnected or integral to the terminal 20 by means of connection 28 to the error and status card 34. The purpose of the panel indicators 26 is to provide for a local display of error flags, calibration or configuration modes or the like associated with the particular terminal 20 for purposes of facilitating diagnostics, repair, or replacement of cards or components within the terminal 20. The error flags may further be provided as ancillary data transmitted along with the measurement sensor data via line 40.

It will be noted that in a preferred embodiment the network data bus 18 and associated bus controller 16 may preferably be in the form of a standardized serial data bus such as a bus conforming to Mil-Std-1553B, whereby a plurality of terminals 20 may be connected in a distributed fashion to a single serial half-duplex bus for command/polling of the terminals. The preferred embodiment for connection of the monitor terminal 12 to the bus controller 16 may preferably be in the form of a conventional data bus such as RS-222 so that a simple keyboard/CRT terminal may be utilized. However, it is specifically contemplated by the present invention that it may be adapted to alternate types of programming interfaces since the general design of the system 10 described herein is independent of specific types of interfaces.

Still referring to FIG. 2, a bus interface unit 30 is interconnected to the network data bus 18 and further interconnected by means of connection 38 to a parameter measurement unit 32. The interface unit 30 and measurement unit 32 may be seen depicted in greater detail in FIG. 3 and will hereafter be described in such detail with reference to FIG. 3. Although, for present purposes the interconnection 38 between interface unit 30 and measurement unit 32 as shown in FIG. 2 has been depicted as a large double headed arrow, it will be noted from FIG. 3 that this is actually intended to schematically indicate four signal lines 38*a–d* which are conventional data, address, control and interrupt lines, respectively, typically associated with microprocessor based systems such as that of the present invention.

Referring to the bus interface unit 30, one purpose of this unit is to translate commands received from the monitor terminal 12 through bus controller 16 into parameters which the measurement unit 32 can recognize and utilize for reconfiguring the remote terminal 20. The unit further is for formatting and transmitting desired parameter data measurements generated by one or more of a plurality of external sensors 44 through the controller 16 and back to the terminal 12 and to higher speed external data network or telemetry or monitor equipment.

Still referring to FIG. 2, an adaptive data multiplexer unit 46 comprises a major portion of the measurement unit 32. The basic purpose of the measurement unit 32 is to acquire, digitize, and store data delivered from the external sensors 44 on lines 42 to the multiplexer 46. However, additional functions are provided by the measurement unit 32. First, the adaptive data multiplexer unit 46 formats the digitized parameter measurement data for transmission through the interface unit 30, bus controller 16, to the terminal 12, or to external high speed transmission or monitor equipment. In a preferred embodiment, the higher speed formatting may preferably be the familiar biphase-L PCM serial data form well known in the telemetry art which exhibits favorable characteristics in terms of maintaining lock and noise immunity. However, the invention is not intended to be so limited to specific types of communication links and contemplates use of other such links as appropriate.

Yet another purpose of the multiplexer unit 46 portion of a remote terminal 20 is to store and transmit to the monitor terminal 12 signals indicating the present status and configuration of the various components of the measurement unit 32 (gain of channels, sample rate, etc.) in response to prompted request commands transmitted from the terminal 12 to the terminals 20. Yet an additional important feature of the measurement unit 32, again in response to commands delivered to the terminals 20 from the terminal 12, is to store and transmit to the terminal 12 digital commands which may be translated at the monitor-terminal 12 into visual menu-driven commands prompting the user operator to provide the input configuration or reconfiguration parameters which will be communicated to the terminals 20 after being input at terminal 12. Such system configuration or reconfiguration data will then be automatically acted upon by terminals 20, either in real time during the general period of ongoing generation of measurements or before or after, so as to reconfigure each of the terminals as desired and dictated by the particular application of the instant invention.

The external N sensors 44 may be of any type employable to generate desired parameter measurements depending upon the particular application of the subject invention and are not intended to be limited in form or function. Thus, in particular applications, these sensors 44 may take the form of current, voltage, pressure, temperature, strain, acceleration sensing transducers or the like. The multiplexer 46, as will become more readily apparent hereinafter, provides for appropriate instrumentation amplifier functions, as well as sampling rate control, gain control, analog-to-digital conversion and the like, to be hereinafter detailed with reference to FIG. 3.

Finally, in FIG. 2, it will be noted that a typical remote terminal 20 will further include an error and status display card 34 which may receive outputs 36 and 40 from the aforementioned interface unit 30 and multiplexer 46, respectively. In response to these outputs 36 and 40, the error and status card 34 will generate an output 28 which may cause a visual display on the panel indicators 26. Such indicators may designate a number of error and status conditions as desired, such as the results of tests performed by built-in test equipment in the terminals 20 resulting from an operator initiated self-check routine which may include parity checks of the transmission link or the like, calibration error, status of the particular terminal 20 (i.e., what mode particular terminal 20 is in, whether it be data acquisition, parameter initialization or reconfiguration, parameter down loading, self checking, etc.). Additionally, the built-in test equipment results may be output via line 40 to the multiplexer 46 for transmission along with the sensor measurement data.

Figure 3:
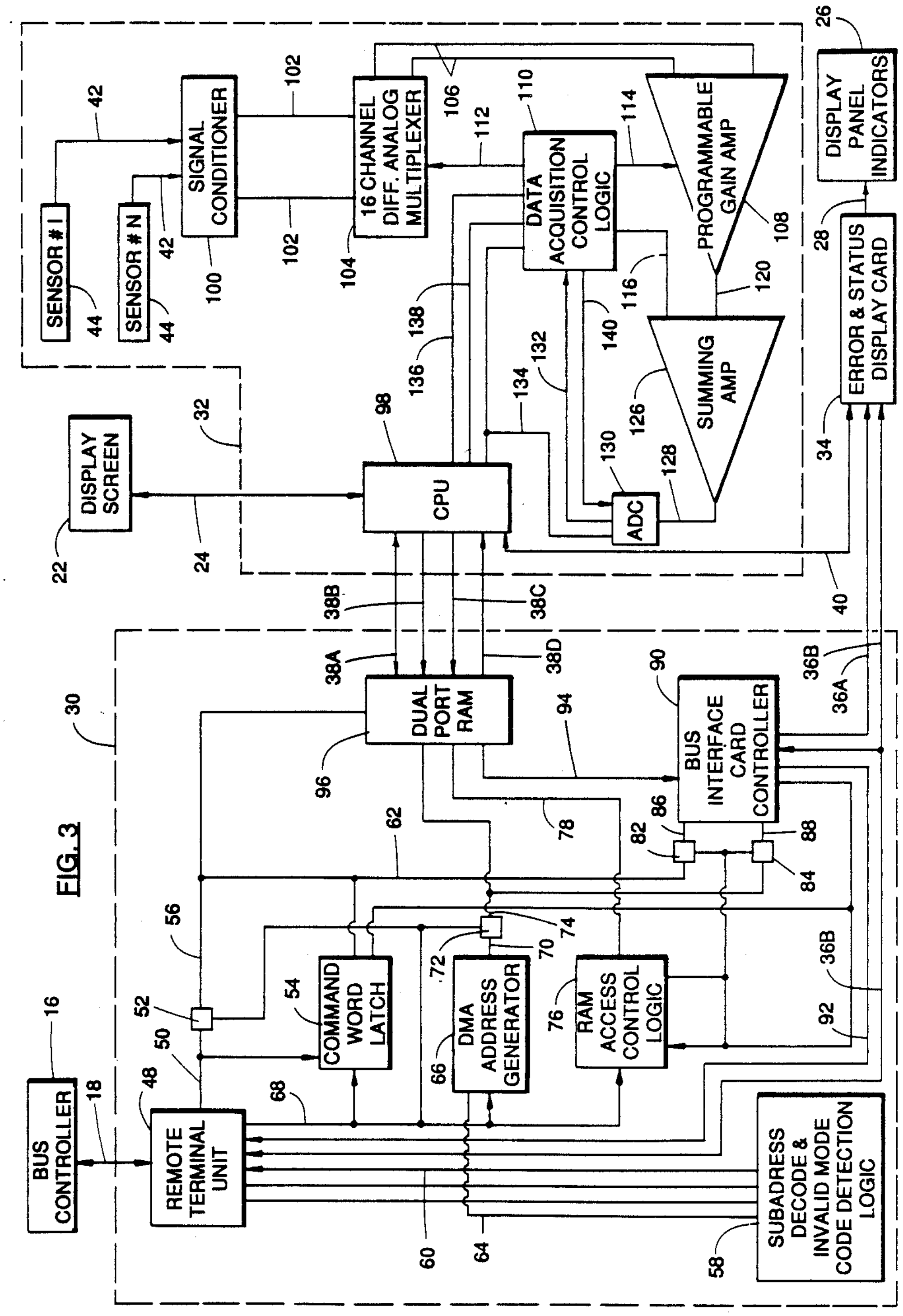
FIG. 3 is a more detailed functional block diagram of the bus interface unit, and adaptive data multiplexer depicted in FIG. 2.

With reference to FIG. 3, the parameter measurement unit 32 components will first be described in greater detail followed by the functional components comprising the bus interface unit 30. A plurality of external N transducer sensors 44 are provided for measuring various parameters as desired, such as temperature, strain, pressure, or the like. The sensor outputs 42 are fed to appropriate signal conditioner circuitry 100 which, in a conventional manner, serves to condition these instrumentation signals in a conventional manner by way of noise and aliasing filtering, level normalization and the like. Conditioned signal outputs 102 are delivered to a multiple channel differential analog multiplexer 104. It will be noted that for clarity, only two sensors 1 and N and two correlative signal conditioner output signals 102 are shown, although any number of such sensors and output signals may be provided as desired, depending upon the application and the parameters to be sensed.

The multiplexer 104, in response to a control logic output signal 112 will provide outputs 106 which sequentially correspond to any desired sequence of output signals 102 and corresponding sensor 44 outputs. Both the sequence and duration of sampling of each sensor measurement channel may be controlled by the logic output signal 112, with these sequential multiplexer output signals 106 being fed to a programmable gain amplifier 108. The gain control signal 114 from the control logic 110 is delivered to the amplifier 108 to adjust the gain or amplification of these multiplexer output signals 106 in a manner to be hereinafter described.

After the signals 106 are amplified by the gain amplifier 108 at a magnitude controlled by the gain signal 114, the programmable gain amplifier output 120 is delivered to one input of a summing amplifier 126. The other input to the summing amplifier 126 is an offset control signal 116 delivered from the control logic 110. The purpose of this control signal 116 is to provide a variable DC offset voltage as a bias level for each of the multiplexer output signals 106 as desired and as determined by the particular characteristics of each of the sensors 44 such as for bipolar tension/compression strain sensors. The summing amplifier output 128 is thence delivered to a conventional analog-to-digital converter 130 which converts each parameter or sensor measurement, after appropriate gain and offset adjustments via amplifiers 108 and 126 respectively, into a sequence of digital representations of each of the parameter measurements. These representations appear as outputs of the ADC 130 on the data line 134 which is delivered to a microprocessor depicted as CPU 98. It will be recalled that one feature of the present invention is to provide a means whereby in response to signals from the monitor-terminal 12 prompted from the terminals 20, the configuration of the remote terminals 20 may be varied. The term reconfiguration is meant in a broad sense to include, but not by limitation, varying raw analog sensor data by means of varying the aforementioned signal conditioning as desired to convert the inputs to a normalized voltage range, varying programmable gain amplification as required in the amplifier 108, varying bias levels for bipolar signals or the like as per summing amp 126, varying sampling rate of the various parameters and the characteristics of A-to-D signal conversion, such as the start and stop time of the conversion, varying the characteristics of an automatic gain rescaling feature, and the like.

Accordingly, when such configuration commands are sent by the operator at the terminal 12 through the bus controller 16 to the particular terminal 20, such commands appear on data, address, control, and interrupt lines 38A, B, C, and D, respectively, which are delivered to the CPU 98. Correlative data, address, and control lines 134, 136, and 138 thereby control particular functional components of the parameter measurement unit 32 as desired in a conventional microprocessor-based instrumentation system. As a particular example, in response to command data signals on line 38A received by the CPU 98, a data command signal will be delivered to the control logic 110 which will generate in response to the particular command signal a correlative control logic output signal 112 to control the operation of the multiplexer 104 in selecting the desired parameter measurement signals and sequence. Similarly, in response to a different data command from the terminal 12, a correlative data signal will be delivered from the CPU 98 to the control logic 110 to generate a start conversion signal 140 at the appropriate time, after which an end of conversion signal 132 will be delivered from the converter 130 to the control logic 110 signaling completion of conversion of a particular parameter measurement to digital form. An additional function of the CPU 98 is to format the thusly acquired data, as well as status, health, self test, and reconfiguration request commands, so that this information may be transmitted by operation of lines 38A–D through the bus interface unit 30 and thence to the monitor terminal 12 and to the external higher speed transmission/monitor equipment.

It will be recalled that another feature of the present invention is to provide for a simple means for reconfiguring the system 10 wherein reconfiguration command controls are stored in firmware in the remote terminals 20. Thus, digital word instructions are stored in the non-volatile ROM of CPU 98 of the particular terminal 20 which may be delivered in response to a request signal from the operator at the monitor terminal 12 to the terminal 20 whereupon the monitor 12 will be caused to generate visual command menu display pages perceptable by the operator. The command menus will list and prompt from the operator simple keyboard entries on terminal 12 for basic set-up or reconfiguration commands to be sent to the terminals 20 as previously described. For example, if the operator desires to vary the gain or bias level of individual channel parameters being measured, he may select from the menu and enter appropriate key strokes, such as 01. The terminal 20, in detecting this desired action, then transmits digital instructions to cause the monitor to display a parameter entry display page. From this menu page, the operator would thence select, by means of standard keyboard entries, the desired parameters to be associated with each measurement channel; i.e., gain, sampling rate, and bias settings, automatic scaling options, and the like. Such instructions would be transmitted from the terminal 12 to the terminal 20 wherein these parameter settings would be stored in the non-volatile EAPROM of CPU 98 in order to configure the particular terminal 20 for the desired data acquisition operation. After initial set-up, a next keyboard entry such as 04 entered at the terminal 12 could be conveyed to the terminal 20, thus placing the system 10 into a real time data acquisition and output mode. Any subsequent measurement parameter changes, either in real time or after acquisition of data, could thence be made simply and quickly by re-entering an 01 on the terminal 12 and typing in new channel parameter values. It is a feature of the invention to simultaneously display these present parameter settings with real time data readings being transmitted from the terminal 20 to terminal 12 at a relatively slow sampling rate, e.g. 1 sample per second which may be readily seen on the monitor. The directness and simplicity of the menu/data pages permits a relatively unskilled operator to be trained to re-program the system 10 in a short period of time.

It will be noted that in the simplified embodiment depicted in FIG. 3, only a relatively few number of reconfiguration control lines have been depicted, such as line 112 for adjusting sampling rate, channelization, and channel sequence, 114 for gain, and 116 for offset. However, the invention is not intended to be so limited, and any desired number of reconfiguring control lines may be employed for any number of purposes well known in the art. It will further be appreciated that one of the configuration parameters sent from the monitor terminal 12 to the remote terminal 20 may be for automatic re-scaling. Not infrequently throughout the course of parameter measurements, particularly when the range of such measurements may not be correctly anticipated, a particular measurement may exceed full scale, in which case it would be desirable to program for automatic adjustment of gain in the amplifier 108 to insure that measurements do not exceed full scale. Accordingly, yet an additional function of the CPU 98 may be to control such function whereby when the amplifier 108 gain is thereby automatically adjusted in response to the CPU 98, this adjustment is recorded by the CPU 98 and delivered back to the terminal 12 at appropriate times in the data frame.

It may be appreciated from the foregoing that whereas a primary function of the parameter measurement unit 32 is to acquire, digitize, store, and transmit sensor data as well as status, health, and reconfiguration commands, the function of the bus interface 30 is to translate commands such as reconfiguration of channel parameters from the bus controller 16 into parameters the measurement unit 32 can receive, as well as to set up proper signaling for transmitting channel data and the like back to the bus controller 16. Accordingly, the more detailed functional blocks of the bus interface unit 30, as shown in FIG. 3, will now be discussed in greater detail.

When a command is transmitted from the monitor terminal 12 indicating it is desired to view data from the external sensors 44 at the remote terminal 12, a corresponding command to send data is transmitted from the terminal 12 and received in the remote terminal unit 48 wherein it is decoded. In the command word, there is a subaddress, i.e., a starting location of where the desired data resides in the ram 96 as well as a word indicating the number of data words desired. The subaddress and desired number of data words is decoded in the logic circuit 58 and transferred on line 64 to a direct memory access address generator 66. The DMA generator 66, thereby from knowing the starting address wherein data is located, as well as the number of data words, generates memory addresses for all data words to be retrieved sequentially from the ram 96. The DMA address generator 66 thereby sends these addresses on address line 70 through tristate buffer 72 and on line 74 to the ram 96. In a similar fashion, when the data request signal is received by the remote terminal unit 48, decoded, and indication of the receipt delivered on message transfer control line 68 to the ram access control logic 76, ram control signals are generated and delivered on line 78 to the ram 96 corresponding to the address codes on address line 74 so as to fetch the data from the appropriate locations in the ram 96.

It will be noted that the logic circuit 58 includes invalid mode code detection. Mode codes are associated with the particular selected bus 18 for maintenance of internal logic of the bus interface unit 30. Depending upon the hardware implementation of the mode codes permitted by the bus to be used with the hardware, programmable read only memory associated with the CPU 98 will include corresponding lookup tables whereby the particular instruction code sent to the logic 58 may be compared to the lookup table. Validity of the particular mode code may be determined, whereupon the command will be permitted to pass through to the ram 96. If a match is not detected, the CPU 98 will generate a flag indicating a non-permitted mode code; i.e., an illegal command on line 60. This indication will be provided to the unit 48 and thence to the monitor terminal 12 for keyboard entry error notification to the operator.

Ram logic 76 is dependent upon signals coming from the remote terminal unit 48 that initiate data transfer for each data word. In a typical embodiment for N channel data words, message transfer control signals would thus appear N times at the dual port ram 96, and thus be delivered on message transfer control line 68 through ram logic 76 and out to the ram 96 on line 78. In response, data words would thence be sent to the remote terminal unit 48 on data line 56 through tristate buffer 52 and on line 50 to terminal 48 and thence back to the terminal 12.

Still referring to FIG. 3, a command word latch 54 is provided which latches in parallel the command word received by the terminal unit 48. Thus, a particular command word from the terminal 12 will be stored in the latch 54 so that it is available on data line 62 through tristate buffer 82 and on line 86 to the bus interface card controller 90. The purpose of this is so that the bus interface card controller 90 may view the command word stored in latch 54 as required to perform internal housekeeping wherein the command word is periodically retrieved and later processed for internal use.

The reconfiguration commands received by the controller 90 are not in a format suitable for processing by the CPU 98, hence, the reconfiguration commands are translated by the card controller and CPU 98 into compatible format for processing by the CPU 98 software. Once such commands are translated, the controller 90 notifies the microprocessor 98 thereby indicating that reconfiguration parameters are available in the dual ram 96 at specified memory locations, thereby instructing the CPU 98 to fetch them, store them in EAPROM and re-program the terminal 20. Once the microprocessor 98 has thereby been notified that reconfiguration parameters are available, the microprocessor 98 locates them in ram 96, reconfigures the system, and then echoes them back to ram 96 thereby indicating to the bus interface unit that reconfiguration is complete. The card controller 90 then checks to see if such reconfiguration is correct and, if so, sets an appropriate status flag 92 on the bus 18 thereby notifying the bus controller 16 that reconfiguration was effected correctly. It will be noted that the bus controller 16 may request echo of reconfiguration commands requesting that the reconfiguration parameters be transmitted through the network data bus 18 to insure that reconfiguration has been correct.

The ram 96 is a dual port ram wherein one side may be shared by the network data bus interface logic and bus card controller 90 permitting one or the other to have access to the ram 96 without loading the other down, whereas the remaining side of the ram 96 may be accessed by the CPU 98. A bus access signal 80 indicates when the card controller 90 desires to be on the bus, whereupon appropriate tristate devices 82 and 84 are enabled for accessing the dual port-ram 96 through lines 86 and 88 respectively. The bus controller 16 may interrogate the terminals 20 by requesting data words relating to status, health, built-in test equipment, information or the like. A number of flags 36A, B and 92 may be generated by the card controller 90 for delivery to the terminal 12 or for display through the error and status card 34. Such flags would include a status register flag indicating health status of the bus interface unit or subsystem, a remote terminal flag to indicate error in the network data bus, possible hardware problems with the bus interface unit or subsystem, and a subsystem busy flag. The latter indicates that the terminal may be processing data at the time and unable to transmit data. An interrupt line 94 from ram 96 to the card controller 90 provides for interruption of the controller 90 by the CPU 98.

Some remaining details with reference to FIGS. 1-3 may be noted in passing. First, a connection (not shown) in FIG. 1 may be made from the bus controller 16 to external (higher rate) data networks, or telemetry transmission or monitor equipment as desired. Whereas in FIGS. 2 and 3 sensors 44 are depicted therein as being within measurement unit 32 it will be appreciated that the actual physical location of the sensors is a matter of choice and typically may actually be disposed externally of the remote terminal.

While a single embodiment of the invention has been described, variations thereof can be made without departing from the teachings of the invention. For example, another embodiment may include the elemental case for a smaller data acquisition system whereby only one adaptive terminal is required, and therefore the monitor-terminal and external higher-speed transmission/monitor equipment may connect directly to a single adaptive terminal, thereby eliminating the additional complexity of bus controller 16, network data bus 18, and bus interface card 30. For example, FIG. 3 depicts the display screen 22 of monitor terminal 12 connected directly to remote adaptive terminal 20 via connection 24. Therefore, it is intended that the scope of the invention be limited only by the claims which follow.

We claim:

1. An adaptive data acquisition multiplexing system comprising:
 monitor terminal means for
  generating system configuration and reconfiguration programming commands and
  providing visual indications of output parameter measurements, operating status, and configuration of said system;
 at least one remote terminal means disposed remotely of
 said monitor terminal means for
  generating a plurality of said parameter measurements in functional dependence on said system configuration and reconfiguration commands and
  generating indications of remote terminal configuration status; and for
  transmitting said measurements and said status to said monitor terminal means.

2. The apparatus of claim 1 wherein said at least one remote terminal means includes:
 first storage means for storing a plurality of instructions for prompting said system reconfiguration programming commands; and wherein
 said monitor terminal means further includes display means for sequentially displaying visual representations of said plurality of instructions.

3. The apparatus of claim 2 wherein said at least one remote terminal means further includes second storage means for storing said system configuration and reconfiguration programming commands.

4. The apparatus of claim 3 wherein at least one of said first and second storage means is electrically eraseable in response to a signal generated at said monitor terminal means.

5. The apparatus of claim 4 wherein said remote terminal means further includes:
 means responsive to said system configuration and reconfiguration programming commands for altering at least one parameter measurement characteristic associated with measurement of at least one of said plurality of said parameter measurements.

6. The apparatus of claim 5 wherein said at least one parameter measurement characteristic is at least two characteristics selected from the group including; gain, automatic gain rescaling, bias, sampling rate, and channel selection.

7. A method for reconfiguring a data acquisition multiplexing system having a monitor terminal and at least one remote terminal comprising:
 storing in said remote terminal a plurality of instructions for prompting system reconfiguration programming commands;
 transmitting said instructions to said monitor terminal;
 generating sequentially visual displays corresponding to said instructions at said monitor terminal;
 inputting said programming commands in functional response to said visual displays;
 transmitting said programming commands to said remote terminal;
 reconfiguring said remote terminal in response to said transmitted programming commands; and
 generating a plurality of parameter measurements in said remote terminal.

8. The method of claim 7 further including:
 storing said transmitted programming commands in said remote terminal; and wherein
 said plurality of measurements are generated in response to said reconfiguring of said remote terminal.

9. The method of claim 8 wherein said system is realtime reconfigurable whereby said reconfiguring is during said generating of said measurements.

10. The method of claim 9 further including:
 transmitting said plurality of measurements to said monitor terminal; and
 generating visual displays of said plurality of measurements at said monitor terminal.

11. The method of claim 10 further including:
 generating at said remote terminal indications of the configuration status of said terminal;
 transmitting said configuration status indications to said monitor terminal; and
 displaying at said monitor terminal visual representations of said configuration status indications.

12. The method of claim 11 wherein said step of reconfiguring said remote terminal comprises:
 varying at least one of the group comprised of the gain, automatic gain rescaling, bias, sampling rate, or channel selection corresponding to at least one of said measurements.

13. The method of claim 12 wherein said varying of said sampling rate depends on available bandwidth for said transmitting of said plurality of measurements to said remote terminal.

14. A reconfigurable data acquisition multiplexing system comprising:
 a monitor terminal and at least one remote terminal;
 wherein said remote terminal includes;

means for storing a plurality of instructions for prompting system configuration programming commands, means for transmitting said instructions to said monitor terminal, and means for generating a plurality of parameter measurements;

said monitor terminal including;

means for sequentially generating visual displays corresponding to said instructions, and means for inputting said programming commands in functional response to said visual displays;

and said remote terminal further including means for reconfiguring said remote terminal in response to said transmitting programming commands.

15. The apparatus of claim 14 further including:

means for storing said transmitted programming commands in said remote terminal; and means for generating said plurality of measurements in response to said reconfiguring of said remote terminals.

16. The apparatus of claim 15 further including:

means for reconfiguring said remote terminal in real time during said generating of said measurements.

17. The apparatus of claim 16 further including:

means for transmitting said plurality of measurements to said monitor terminal; and means for generating visual displays of said plurality of measurements at said monitor terminal.

18. The apparatus of claim 17 further including:

means for generating at said remote terminal indications of the configuration status of said terminal;

means for transmitting said configuration status indications to said monitor terminal; and means for displaying at said monitor terminal visual representatives of said configuration status indications.

19. The apparatus of claim 18 wherein said means for reconfiguring said remote terminal includes:

means for varying at least one of the group comprised of the gain, automatic gain, rescaling, bias, sampling rate, or channel selection corresponding to at least one of said measurements.

20. The apparatus of claim 19 further including:

means in said remote terminal for varying said sampling rate in functional dependence on available bandwidth for said plurality of measurements transmitted to said remote terminal.

* * * * *